(12) United States Patent
Rottmerhusen

(10) Patent No.: US 6,380,702 B1
(45) Date of Patent: Apr. 30, 2002

(54) COMMUTATOR MOTOR CONTROL SYSTEM

(75) Inventor: Hans Hermann Rottmerhusen, Tellingstedt (DE)

(73) Assignee: Metabowerke GmbH & Co., Nurtingen (DE)

( * ) Notice: Subject to any disclaimer, the term of this patent is extended or adjusted under 35 U.S.C. 154(b) by 0 days.

(21) Appl. No.: 09/555,086

(22) PCT Filed: Nov. 9, 1998

(86) PCT No.: PCT/DE98/03282

§ 371 Date: May 24, 2000

§ 102(e) Date: May 24, 2000

(87) PCT Pub. No.: WO99/27643

PCT Pub. Date: Jun. 3, 1999

(30) Foreign Application Priority Data

Nov. 25, 1997 (DE) .......................................... 197 52 070
Feb. 10, 1998 (DE) .......................................... 198 05 182

(51) Int. Cl.⁷ ............................................... H02P 23/64
(52) U.S. Cl. ....................... 318/245; 318/244; 388/805; 388/812; 388/813; 388/820; 388/937
(58) Field of Search ................. 318/244, 245; 388/805, 812, 813, 820, 937

(56) References Cited

U.S. PATENT DOCUMENTS

| | | | | |
|---|---|---|---|---|
| 3,716,771 A | * | 2/1973 | Maynard | 318/331 |
| 3,798,519 A | * | 3/1974 | Habisohn | 318/46 |
| 4,306,264 A | * | 12/1981 | Alessio | 361/23 |
| 4,323,831 A | * | 4/1982 | Bradler | 318/245 |
| 5,268,622 A | * | 12/1993 | Philipp | 318/254 |
| 5,448,141 A | * | 9/1995 | Kelley et al. | 318/254 |
| 5,754,019 A | * | 5/1998 | Walz | 318/434 |
| 5,811,945 A | * | 9/1998 | Hellinger et al. | 318/246 |
| 5,838,122 A | * | 11/1998 | Vu | 318/254 |
| 5,856,731 A | * | 1/1999 | Rottmerhusen | 318/245 |
| 5,889,922 A | * | 3/1999 | Bufe et al. | 388/804 |

FOREIGN PATENT DOCUMENTS

DE    3525421 A1 *  1/1987  ............. H02P/7/63

* cited by examiner

*Primary Examiner*—Robert E. Nappi
*Assistant Examiner*—Tyrone Smith
(74) *Attorney, Agent, or Firm*—Charles E. Baxley, Esq.

(57) ABSTRACT

The invention relates to a control system for a commutator motor which is operated by phase-fired control. Allocation of a first and second control device in a single operating state without transition makes it possible to obtain constant jolting rotation of said motor by continuously varied cutting of the half-waves into first and second area sections (8,7) of an alternative current voltage. The inventive type of control system can be used advantageously in electric screwing or drilling tools.

10 Claims, 4 Drawing Sheets

COMMUTATOR MOTOR CONTROL SYSTEM

Figure 1:
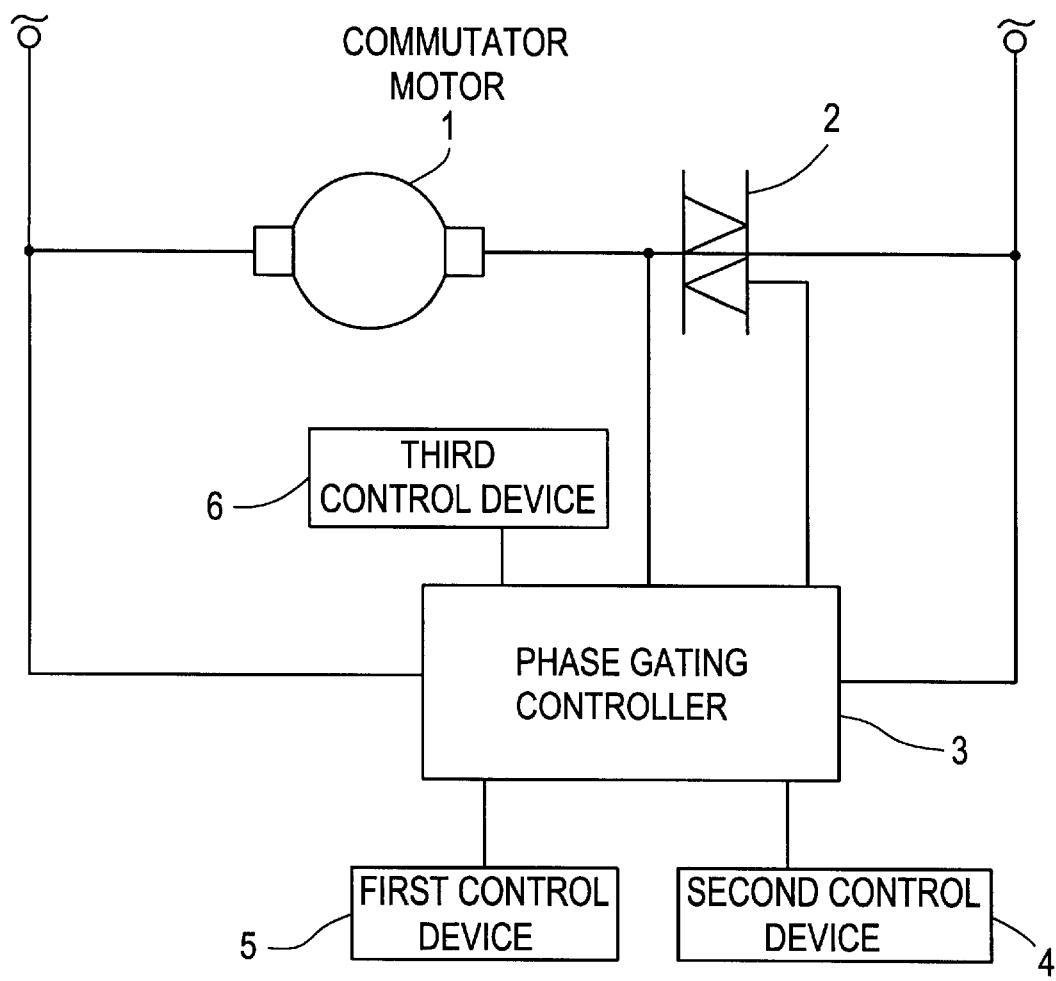

The invention relates to a controller for a commutator motor operated with the aid of a phase-gating controller, having a steady and also a jerky rotational behavior of the commutator motor, for which purpose the phase-gating controller is assigned a first and a second control device, for a first and a second gating of the half waves of an AC voltage.

The speed of commutator motors can be controlled in a variable fashion by the assignment of an electronic system. Such an electronic system can, for example, include a phase-gating controller in the case of AC operation, or a pulse-width modulator in the case of DC operation. Such controllable commutator motors are also advantageously applied in the case of electric hand tools.

There are applications for electric hand tools, for example in the case of power-intensive screwing operations and reliable drilling into sheet metal and aluminum, in the case of which it is advantageous when the electric tool is provided with an electronic system with the aid of which it is possible to achieve a rising and falling torque or a pulsed speed in the case of a commutator motor.

Such an electronic system is disclosed, for example, in DE 195 01 430 A1. A description is given there of a method for driving an electric motor which is applied in the case of electric tools. An electric voltage (U) is applied to the electric motor (1) with variable pulses (11, 11', 20) in such a way that the rotor of the electric motor is moved at a settable speed (n1, n2). Phase-gating controllers or pulse-width modulators are applied for this purpose. The jerky or impulsive movement of the rotor of the electric motor (1) is achieved by virtue of the fact that parts of individual pulses (11, 11', 20) are cut out by superimposing a pulse pause (12, 12', 22) with a zero voltage. Furthermore, DE 195 01 430 A1 describes a circuit arrangement for driving an electric motor (1) with the aid of an electronic control system (5) and an electronic circuit-breaker (4), in the case of which the electronic circuit-breaker (5) is switched by the electronic control system (5) in such a way that variable pulses (11, 11', 20) of an electric voltage (U) can be applied via the electronic circuit-breaker (4) to the electric motor (1) for the purpose of operating the electric motor at a preset speed (n1, n2). The jerky or impulsive movement of the rotor of the electric motor (1) is achieved here by virtue of the fact that the electronic control system (5) includes means for disconnecting the electronic circuit-breaker (4) during at least parts of at least individual pulses (11, 11', 20).

The disadvantage of driving an electric motor in such a way consists in that in the case of a phase-gating controller, for example, a constant number of half waves of an AC voltage are respectively completely cut out. This measure is disruptive, particularly in the case of a low speed, that is to say in the case of large gating of the remaining half waves, since a continuous speed is more advantageous during a screwing operation in the case of a low speed.

EP 0 784 884 B1 discloses an electronic system with the aid of which it is also possible to set a jerky speed. Here, an electric screwdriver is described which has a universal motor (1) which is driven by means of a phase-gating controller (3) for determining variable speeds, it being possible for the phase-gating controller (3) to be switched over to wave-packet-controlled phase-gating control. It is also the case that not all half waves of the system are passed in the case of wave-packet-controlled phase-gating control. The passing and non-passing of the half waves is achieved with the aid of an oscillator (4) which can be connected to the phase-gating controller. The further the frequency of the oscillator (4) is situated below the system frequency of 50 Hz, the fewer half waves of the system are passed.

The mode of operation of this controller corresponds to that of DE 195 01 430 A1, and the disadvantage is therefore also the same.

Laid-Open Patent Application DE 196 09 986 A1 describes a method for operating an electric motor in the case of which use is made of an electronic system with the aid of which it is possible to achieve a first, a second and a third speed. In the case of AC operation of the electric motor, the electronic system comprises a phase-gating controller, and the electric motor is used with electric screwdrivers. The first preset speed is used to turn in the screw until the screw head comes into the vicinity of the material surface, the first operating phase. Once the previously set limiting torque is achieved, the electronic system of the electronic motor is switched over into a further operating phase, and the motor is now driven in such a way that a periodically interrupted so-called secondary torque of the electric motor is exercised by means of torque pauses of a specific length. In the second operating phase, the electronic switch is periodically reconnected, it being possible for the pauses in the reconnection to be up to one second, column 7, line 5 to 10. On the one hand, this is a question of a method in which phase-gating control can be switched over to wave-packet control, column 5, lines 30 to 51, in a fashion similar to the method from EP 0 784 884 B1. On the other hand, it is disclosed in this document that the second speed corresponds to a minimum current flow angle, column 6, lines 53 to 56, column 7, lines 52 to 56. It emerges from the description and the drawing in this document that the electronic system of the phase-gating controller effects at least two or three operating states in an electric tool, the first and the second or the third operating states being a function of the level of the power consumption of the electric motor. If the previously set threshold of the power consumption is exceeded, the electronic system switches over from the first operating state, in which the electric motor of the electric tool can be operated at variable settable continuous steady speeds, into the second and third operating states, in which the electric motor has a more or less jerky rotational behavior.

The method according to DE 196 09 986 A1 with the up to three operating states during a screwing operation with the aid of an electric tool has the disadvantage that the transition from a continuous, steady rotational behavior of the electric motor to a jerky rotational behavior is not performed smoothly, but abruptly.

DE 35 34 052 A1 describes a method for raising an alarm in the event of overloading in the operation of an electric tool, which gives the user an unambiguous indication, which cannot be overlooked, of the overload state. In the event of an overload state, the described method effects a lowering of the power fed to the electric tool, as a result of which the speed of the electric motor is reduced, and subsequently cyclical raising and lowering of the reduced fed power is additionally performed, as a result of which the speed of the electric motor swings to and fro in the case of lowered power until the overload state is terminated. The electric tool is assigned a phase-gating controller controlled by a microcontroller for the purpose of speed control.

The method described here is not applied to screwing and drilling operations with the aid of an electric tool, since lowering the reduced fed power, which is swinging to and fro, is unsuitable for such applications.

It is the object of the invention to create a controller for a commutator motor which delivers a smooth soft transition from a steady rotational behavior of the motor to a jerky rotational behavior of the motor which in the case of a continually rising torque is proportionally amplified accordingly.

This object is achieved by means of the distinguishing features of the independent patent claims 1, 5, 7. Advantageous features of the configuration of the invention are to be gathered from the remaining claims and the description.

The advantage of the controller according to the invention for a commutator motor resides in the fact that the phase-gating controller is assigned control devices with the aid of which a first gating of the half waves of an AC voltage into first subranges, and a second gating of the half waves into second subranges can be carried out to the effect that in the case of a low speed and a low torque a steady rotational behavior of the motor is achieved, and in the case of a continuously rising torque a soft transition, proportional to the torque, is achieved to a jerky, self-amplifying rotational behavior of the motor, such a rotational behavior of the motor advantageously occurring without transitions.

This rotational behavior of the motor is particularly advantageous in the case of screwing operations with the aid of an electric tool. A pulse-width modulator is applied analogously in the case of DC operation of the commutator motor.

Figure 2:
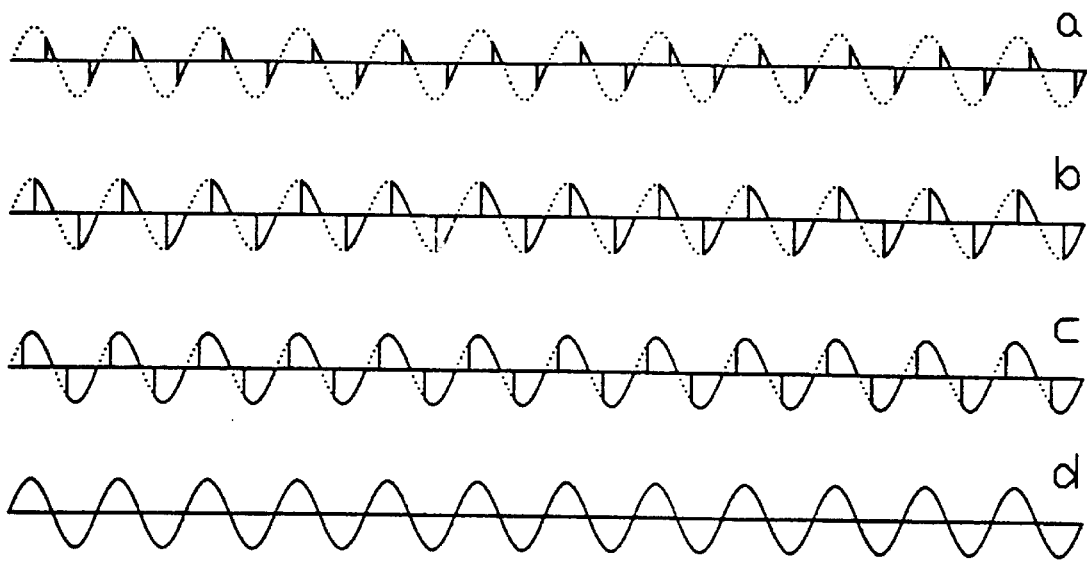
Figure 3:
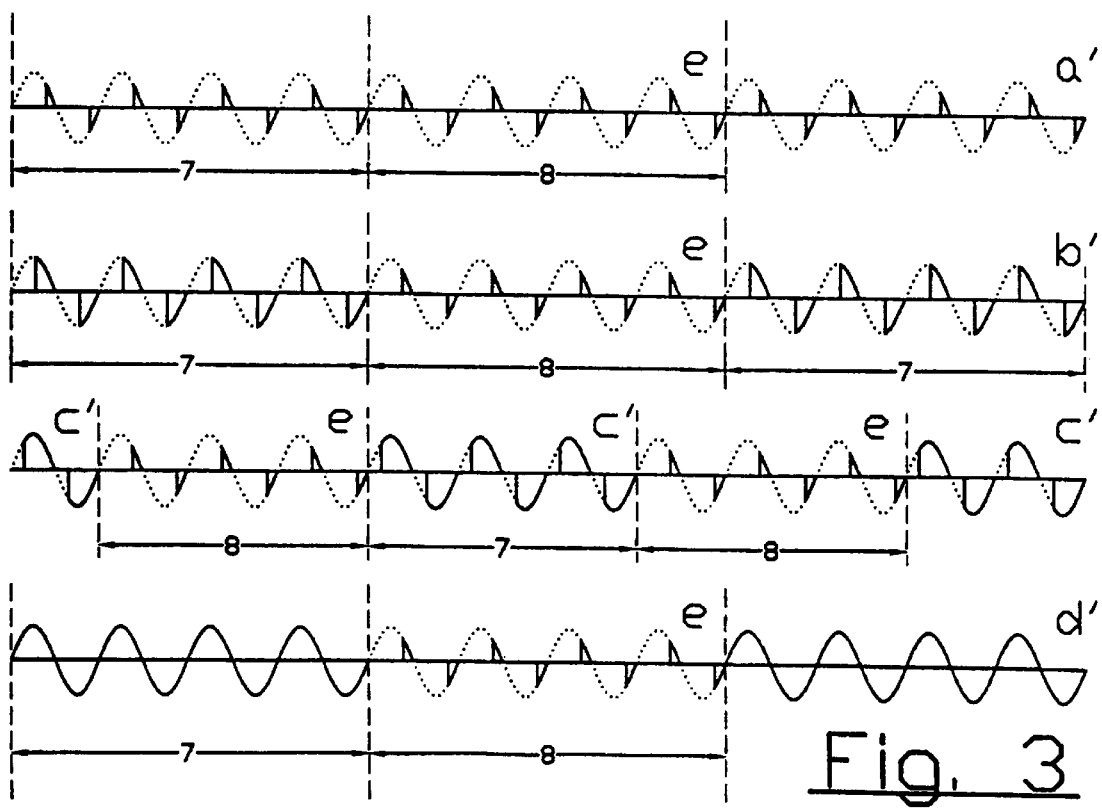
Figure 4:
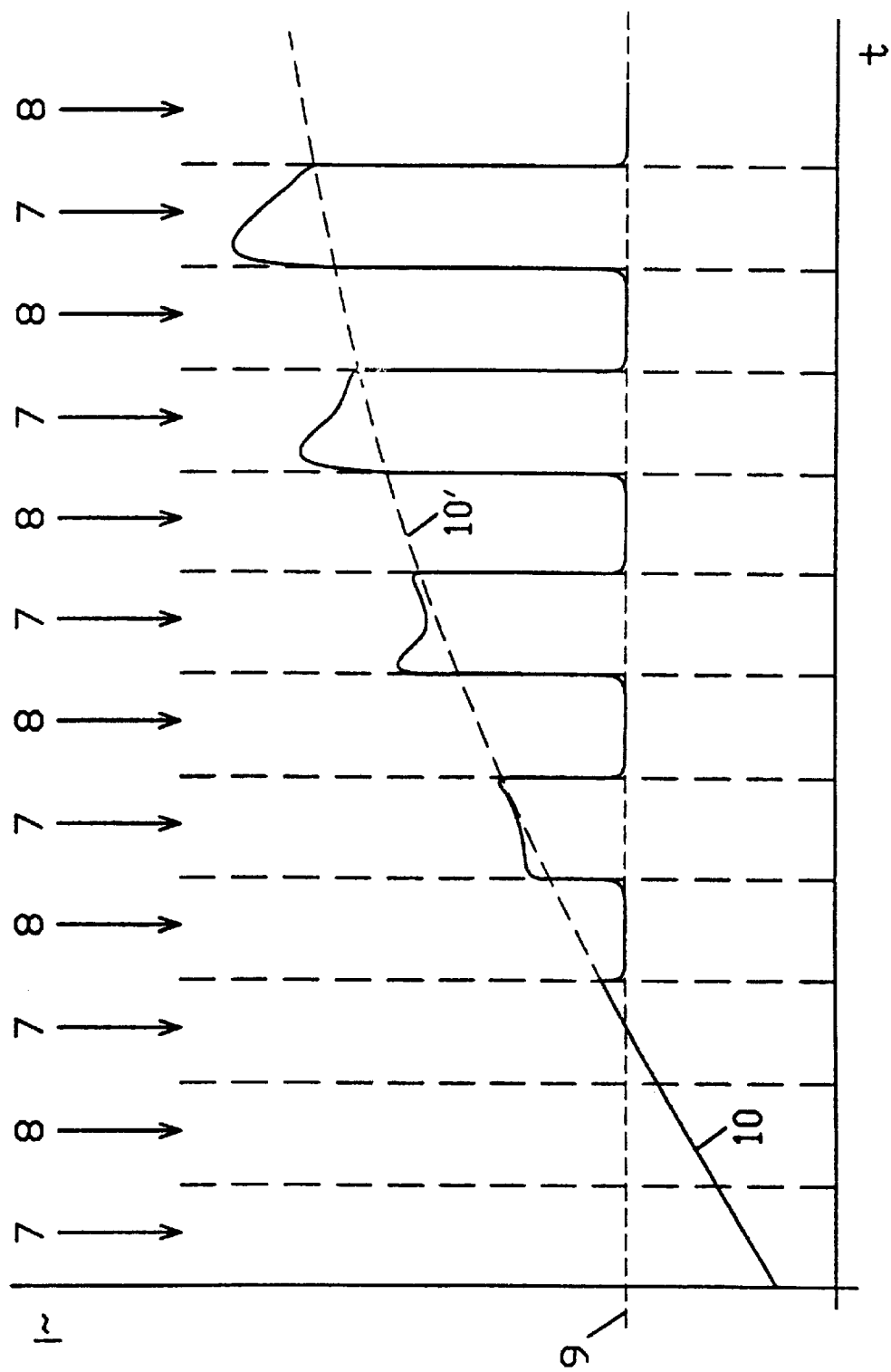
Figure 5:
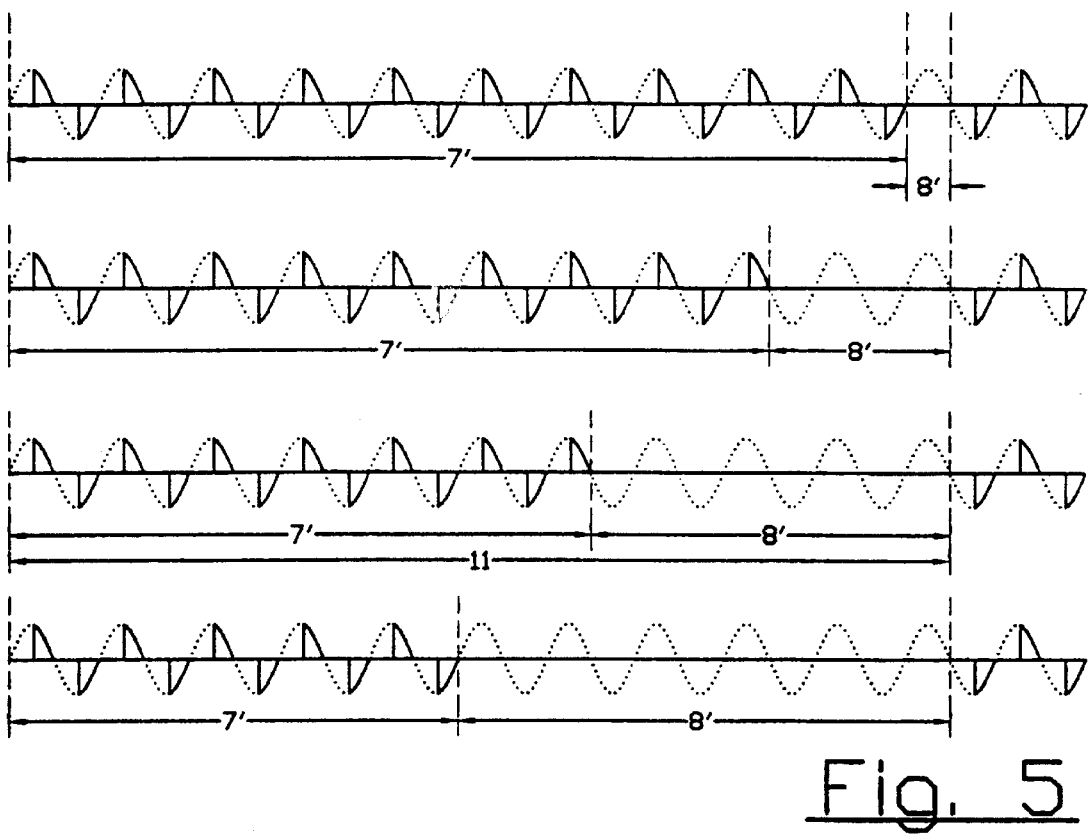
Figure 6:
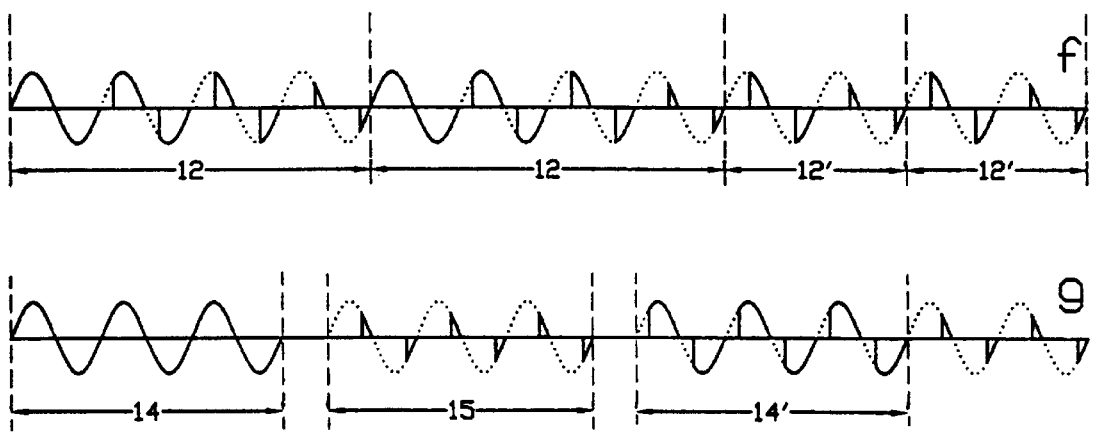

The invention is explained in more detail below with the aid of the drawing, in which:

FIG. 1 shows a circuit arrangement of the electronic controller for a commutator motor, FIG. 2 shows a half-wave illustration of an AC voltage with gated half waves, FIG. 3 shows a half-wave illustration with a first gating in first subranges of an AC voltage and a second gating in second subranges, FIG. 4 shows a graphical illustration of the motor current with reference to the design of FIG. 3, FIG. 5 shows a half-wave illustration with a variably settable gating of the half waves of an AC voltage in first subranges, and a variable cutting out of half waves in second subranges, and FIG. 6 shows a half-wave illustration with a variably settable gating of the half waves from the minimum gating upwards as far as the maximum gating of the half waves in repeating subranges of an AC voltage.

Electric hand tools are largely equipped with an electronic system for speed control by applying a phase-gating controller in the case of AC operation, and a pulse-width modulator in the case of DC operation. For specific applications, the electronic speed control system of the electric tool can be assigned an additional controller for achieving a rising and falling torque of the electric tool motor. The electronic speed control system is correspondingly designed in such a way that the commutator motor of the electric tool can be driven both at a variable steady speed and at a variable, pulsed jerky speed.

FIG. 1 shows a circuit arrangement of such a controller. Connected in series with the commutator motor 1 is a triac 2 which is assigned a phase-gating controller 3. The phase-gating controller 3 can be operated via a first, a second and a third control device 4, 5, 6. The first control device 4 is used to actuate the phase-gating controller in a known way, and the half waves of an AC voltage can be gated in their entirety with the aid of the first control device 4. The first control device can include a settable resistor and be designed as a rotary potentiometer of as a slide potentiometer, the slide potentiometer preferably being arranged in a power switch and being driven with the aid of the operating element of the power switch.

FIG. 2 shows a standard variable gating a, b, c, d of the half waves of an AC voltage, which is achieved with the aid of a phase-gating controller 3 designed in a known way. In order to achieve a pulsed jerky speed in the case of a commutator motor 1, a first and a second controller 4, 5 are assigned to the phase-gating controller 3. Appropriate subranges of half waves of an AC voltage can be influenced with the aid of the second control device 5, which can also include a settable resistor or a step switch, as a result of which first and second subranges of half waves of an AC voltage are formed.

FIG. 3 shows such subranges of an AC voltage. A first gating a', b', c', d' of the half waves is performed in first subranges 7, and a second gating e is performed in second subranges 8, the first and second subranges 7, 8 being continuously repeated in order to achieve a jerky rotational behavior of the commutator motor. The gating of the half waves in the second subranges 8 can be permanently set in a variable fashion with the aid of the second control device 5, and the width and repetition frequency of the second subranges 8 are set with the aid of a third control device 6.

In the case of a standard gating of all the half waves of an AC voltage, the second gating e of the half waves is set with the aid of the second control device 5 to a minimum gating, or this gating is entirely canceled, as a result of which a variable gating of the half waves of an AC voltage is achieved in a known way with the aid of the first control device 4, corresponding to FIG. 2. With a first and a second gating of the half waves of an AC voltage, there are permanently first and second subregions 7, 8 of gated half waves, it being possible for the gating of the half waves of the second subranges 8 to be set independently of the first subranges 7, and with the gating of the half waves of the first subranges 7 the electric motor can be operated variably independently of the second subranges 8.

If the aim is now to achieve a more or less rising and falling torque, and thus a jerky rotational behavior in the case of a commutator motor, the second gating e of the half waves is permanently set correspondingly with the aid of the second control device 5. This second gating of the half waves in the second subranges 8 can be permanently set independently of the first gating of the half waves in the subranges 7. If the permanently set second gating is smaller than the first gating, the half waves of an AC voltage are gated overall via the first control device 4 up to the permanently set gating level 9 of the second gating, and in the further course of the phase-gating reduction of the half waves as far as the minimum or low gating, the half waves are gated only in the first subranges 7 via the first control device 4, the gating level 9 of the half waves which is permanently set with the aid of the second control device 5 remaining constant in the second subranges 8.

The variably permanently settable gating level of the second gating of the half waves in the second subranges 8 can also characterize the region of a set limiting torque in the case of which the gating of the half waves in the second subranges 8 increases, as a function of the torque of the commutator motor, in a fashion proportional to the rising torque of the motor beyond the set limiting torque, with the result that a self-amplifying jerky rotational behavior of the commutator motor is also achieved thereby as a function of the torque. The torque is to be seen with reference to the level of the power consumption of the motor.

In order to screw in large screws with the aid of an electric tool, it is preferable to set a relatively low permanently set gating level 9 of the half waves in the second subranges 8, as for small screws, with the result that at the start, and in the further course of the screwing operation a continuous, steady speed is achieved, and at the end of the screwing operation a more or less jerky speed results without the need for transitions in this case. It is therefore possible in the case of a single operating state to achieve in the case of an electric motor both a steady rotational behavior and a jerky rotational behavior which is amplified in a fashion proportional to the torque.

The first and second gating illustrated here in the first and second subranges of an AC voltage will be explained in yet more detail with the aid of a diagram. FIG. 4 shows a diagram of the current profile during the motor operation in the case of a steady and the case of a more or less jerky rotational behavior of the commutator motor. The AC voltage is split by means of the electronic speed control system of the commutator motor into an appropriate grid comprising first and second subranges 7, 8 of half waves. The first control device 4 gates all the half waves up to the gating level 9, permanently set with the aid of the second control device 5, of the half waves in the second subranges 8. The current curve 10 characterizes the continuously rising current profile during a screwing operation in the case of a steady rotational behavior of the commutator motor up to the gating level 9, which can be permanently set in a variable fashion, of the second subranges 8. Thereafter, a theoretical current curve 10' runs on in a dashed fashion. In the further course of the screwing operation, the torque required for this purpose is increased, and thus so is the power consumption of the commutator motor, the current in the second subranges 8 remaining approximately constant in the case of a power consumption of the commutator motor beyond the permanently settable gating level 9 of the second subranges 8, and the current rising in proportion to the theoretical current curve 10' in the first subranges 7. If the current in the first subranges 7 exceeds the current in the second subranges 8, the speed of the commutator motor in the second subranges 8 drops correspondingly, thus respectively causing a correspondingly increased rise in the current in the first subranges 7. The solution set forth here achieves a smooth soft transition from the variable steady rotational behavior to the jerky rotational behavior of the commutator motor.

According to FIG. 3, in the case of a single operating state both a steady and a jerky rotational behavior are achieved in the case of an electric motor by means of different gating of the half waves in first and second subranges of an AC voltage. This rotational behavior of a commutator motor can also be achieved by variable gating of the half waves in first subranges and by cutting out half waves in second subranges. FIG. 5 shows such a solution. A variable gating of the half waves of an AC voltage with the aid of the first control device 4 of the phase-gating controller is performed in a known way in the first subranges 7'. The first subranges 7' of FIG. 5 show only the same gating in each case. In the second subranges 8', a variably settable number of half waves are cut out with the aid of the second control device 5 by virtue of the fact that the width of the second subranges 8' can be variably set with the aid of the second control device. The minimum number of half waves which can be cut out in the second subranges 8' comprises one half wave. The width of the first and the second subranges 7'; 8' respectively comprises an overall subrange 11. The width of the overall subrange 11 of an AC voltage can advantageously be respectively the same, and the overall subrange is repeated continuously, with the result that the width of the first and the second subranges 7'; 8' can be variably set with the aid of the second control device 5 in such a way that in the event of a larger setting of the width of the second subrange 8', the width of the first subrange 7' is reduced by the same value. The width of the overall subrange 11 can also be capable of being set differently.

The variable gating of the half waves in the first subranges 7', and the cutting out of half waves in the second subranges 8' can be performed with the aid of a microcontroller, it being possible for the setting of the width of the second subranges 8' to be coupled to the torque of the commutator motor. The setting of the torque for the purpose of cutting out half waves in the second subranges 8' is likewise determined with the aid of the second control device 5. The microcontroller is programmed such that upon the achievement of the set torque at least one half wave is cut out, and with increasing torque the cutting out of half waves in the second subranges 8' increases in proportion to the rising torque, resulting in the case of an increase in torque in a self-amplifying jerky rotational behavior of the commutator motor. The width of the first subranges 7' can also be kept constant by virtue of the fact that the width of the second subranges 8' is enlarged in accordance with the increase in the cut-out half waves, as a result of which the width of the overall subranges 11 is also enlarged by the same value.

FIG. 6 shows a further solution with the aid of which a steady and a jerky rotational behavior are achieved in the case of a commutator motor. Here, the phase-gating controller can be influenced with the aid of the second control device 5 such that in the case of a periodic repetition of these subranges the gating of the half waves is performed upwards linearly or non-linearly from the minimum gating to the maximum gating, it being possible for this operation to be coupled to the torque of the commutator motor. This profile of the gating of the half waves of the subranges 12 is illustrated in the first half-wave illustration f of FIG. 6. The beginning of the gating profile of the half waves can be determined variably with the aid of the first control device 4. The beginning of the gating of the half waves, which can be set variably with the aid of the first control device, characterizes the subranges 12' of the first half-wave illustration f of FIG. 6. The number of the half waves in the subranges with a minimum gating and the number of the half waves with a maximum gating can be determined correspondingly. The second half-wave illustration g of FIG. 6 shows such half waves 14, 14', 15, it also being possible here for the beginning of the gating profile of the half waves to be set variably with the aid of the first control device 4.

The gating described here of half waves of an AC voltage with the aid of a phase-gating controller for achieving a steady as well as a jerky rotational behavior in the case of a commutator motor can also be performed analogously in the case of a DC voltage with the aid of a pulse width modulator. The triac 2 is then replaced by a transistor, and instead of the gating of half waves of an AC voltage, DC voltage is cut out differently in appropriate sections. In the case of a pulse width modulator as well, the first and the second control devices 4, 5 are applied for this purpose, it also being possible to assign the third control device 6 to the pulse width modulator.

A controller for a commutator motor in the case of which a plurality of control devices are applied to operate a speed control device with the aid of which a pulsed speed is achieved, is advantageously applied in the case of electric screwdrivers and electric drills.

A pulsed speed in the case of electric tools is particularly well-suited, inter alia, in the case of conveniently starting to drill into all materials without center punching and without wandering of the drill, and such a rotational behavior of the drill permits convenient and reliable drilling into sheet metal and aluminum. Furthermore, a pulsed speed can advantageously be applied in the case of power-intensive screwing operations, chiefly in the case of screws which are difficult to screw in or difficult to loosen.

The invention is not limited to the exemplary embodiments described and illustrated, but can be used in a versatile fashion in the case of electronically controllable commutator motors.

What is claimed is:

1. A controller for a commutator motor (1) operated with the aid of a phase-gating controller (3), having a steady and also a jerky rotational behavior of the commutator motor, for which purpose the phase-gating controller (3) is assigned a first and a second control device (4, 5), for a first and a second gating (a', b', c', d'; e) of the half waves of an AC voltage, wherein during the operation of the commutator motor (1) without transitions, and in the case of a soft transition from steady to jerky rotational behavior both a steady and a jerky rotational behavior of the commutator motor (1) are achieved by a grid-like permanent splitting of the half waves of an AC voltage in first and second subranges (7, 8) in the case of a permanently set gating level (9) of the half waves in the second subranges (8), wherein all the half waves of an AC voltage can be variably gated with the aid of the first control device (4), and the gating of the half waves in the second subranges (8) can be permanently set in a variable fashion with the aid of the second control device (5), the gating of the half waves with the aid of the first control device (4) being controlled in the first and in the second subranges (7, 8) from the maximum gating as far as the permanently set gating level (9) of the half waves in the second subranges (8), and in the further course of the gating reduction of the half waves down to the minimum gating the half waves of an AC voltage are gated only in the first subranges (7) with the aid of the first control device (4), the gating level (9) of the half waves which is permanently set with the aid of the second control device (5) remaining constant in the second subranges (8).

2. The controller as claimed in claim 1, wherein the first variable gating (a', b', c', d') of the half waves in the first subranges (7) can be carried out with the aid of the first control device (4) independently of the second gating (e) of the half waves in the second subranges (8), and the gating level (9) of the second gating (e) of the half waves can be permanently set in variable fashion with the aid of the second control device (5) independently of the first control device (4).

3. The controller as claimed in claim 1 wherein the gating level (9), which can be permanently set in a variable fashion, of the second gating of the half waves in the second subranges (8) characterizes the range of a set limit torque in the case of which the gating of the half waves in the second subranges (8) increases beyond the set limit torque as a function of the torque of the commutator motor (1) in a fashion proportional to the rising torque of the motor.

4. The controller as claimed in claim 1 wherein the second gating (e) of the half waves can be set with the aid of the second control device (5) variably from a low gating or none as far as the maximum gating, and the width of the second subranges (8) and thus the repetition frequency of these subranges (8) can be set with the aid of a third control device (6).

5. A controller for a commutator motor (1) operated with the aid of a phase-gating controller (3), having a steady and also a jerky rotational behavior of the commutator motor, for which purpose the phase-gating controller (3) is assigned a first and a second control device (4, 5), for a first and a second gating (a', b', c', d'; e) of the half waves of an AC voltage, wherein during operation of the commutator motor (1) without transitions both a steady and a jerky rotational behavior of the commutator motor (1) is achieved by means of variable gating of the half waves of an AC voltage with the aid of a first control device (4) in first subranges (7'), and by means of permanently cutting out half waves in second subranges (8') with the aid of a second control device (5), the cutting out of the half waves in the second subranges being coupled to the torque of the commutator motor (1) by virtue of the fact that upon achievement of the torque set by the second control device (5) at least one half wave is cut out and, in the case of an increase in torque, the cutting out of half waves in the second subregions (8') increases in proportion to the rising torque.

6. The controller as claimed in claim 5, wherein the width of a first and the width of a second subregion (7'; 8') respectively form an overall subregion (11), and this overall subregion is repeatedly continuously enlarged, the width of the overall subregions always being the same, or is enlarged by the value of the second subregion (8').

7. A controller for a commutator motor (1) operated with the aid of a phase-gating controller (3), having a steady and also a jerky rotational behavior of the commutator motor, for which purpose the phase-gating controller (3) is assigned a first and a second control device (4, 5), for a first and a second gating (a', b', c', d'; e) of the half waves of an AC voltage, wherein variable steady speeds are achieved with the aid of a first control device (4), and the phase-gating controller (3) can be influenced with the aid of a second control device (5) such that within consecutive subranges (12) of an AC voltage the gating of the half waves in the subranges (12) increases linearly or non-linearly up to the maximum gating, the beginning of the level of the gating of the half waves in the subranges (12') being determined with the aid of the first control device (4).

8. The controller as claimed in claim 7, wherein the number of the half waves with a minimum and a maximum gating in the subranges (12; 12') can be determined, and the beginning of a periodic repetition of the respectively increasing gating up to the maximum gating in the subregions (12, 12') is coupled to the torque of the commutator motor.

9. The controller as claimed in claim 1 wherein the gating and/or cutting out of half waves of an AC voltage can be carried out with the aid of a phase-gating controller in first and second subranges (7, 8; 7', 8'), and the gating of the half waves from the minimum gating up to the maximum gating of the half waves in settable subranges (12; 12') can be carried out analogously even in the case of a DC voltage with the aid of a pulse-width modulator by differently gating the DC voltage in corresponding subranges, the pulse-width modulator being assigned for this purpose a first, a second and a third control device which analogously effect the mode of operation which is achieved in the case of the phase-gating controller by the first, second and third control devices (4, 5, 6) assigned to the phase-gating controller.

10. The controller as claimed in claim 9, wherein in the case of DC operation without transitions, a soft transition from a steady to a jerky rotational behavior of the commutator motor is also achieved with the aid of a pulse-width modulator.

* * * * *